United States Patent [19]

Kajiwara

[11] Patent Number: 5,875,022
[45] Date of Patent: Feb. 23, 1999

[54] FILM IMAGE DETECTION DEVICE AND METHOD

[75] Inventor: Kazuhiko Kajiwara, Kanagawa, Japan

[73] Assignee: Fuji Photo Film Co., Ltd., Kanagawa, Japan

[21] Appl. No.: 639,910

[22] Filed: Apr. 26, 1996

[30] Foreign Application Priority Data

Apr. 28, 1995 [JP] Japan .................................. 7-106737

[51] Int. Cl.$^6$ .............................. G03B 27/52; G06K 7/10; G01N 21/00

[52] U.S. Cl. ................................ 355/55; 355/40; 355/56; 355/68; 250/559.02; 356/443; 356/444; 382/291

[58] Field of Search .................................. 355/40, 41, 42, 355/43, 67, 68, 55, 56; 250/559.02; 356/443, 444, 375, 402–411; 382/291, 293

[56] References Cited

U.S. PATENT DOCUMENTS

| | | | |
|---|---|---|---|
| 5,041,866 | 8/1991 | Imoto ......................................... | 355/38 |
| 5,210,570 | 5/1993 | Minamisawa et al. .................... | 355/38 |
| 5,506,656 | 4/1996 | Nitsch ....................................... | 355/38 |
| 5,555,181 | 9/1996 | Seto .......................................... | 355/41 |
| 5,561,494 | 10/1996 | Terashita ................................... | 355/38 |
| 5,671,041 | 9/1997 | Iwaki ........................................ | 355/38 |
| 5,703,671 | 12/1997 | Narita et al. .............................. | 355/32 |

FOREIGN PATENT DOCUMENTS

| | | | | |
|---|---|---|---|---|
| 4-303833 | 10/1992 | Japan | ............................ | G03B 27/72 |
| 4-350643 | 12/1992 | Japan | ............................ | G03B 27/46 |
| 5-323464 | 12/1993 | Japan | ............................ | G03B 27/46 |

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

There is provided a film image detection method, comprising the steps of measuring densities at a large number of measurement points arranged along a first direction and a second direction crossing the first direction in a measurement area including an image recording range on a photographic film on which an image is recorded, calculating density variation amounts at the measurement points along the first and second directions on the basis of the densities at the measurement points in the measured measurement area, accumulating the calculated density variation amounts at the measurement points along the first direction for each of a plurality of first rows of measurement points constituted by a predetermined number of measurement points arranged along the second direction, and for accumulating the density variation amounts at the measurement points along the second direction for each of a plurality of second rows of measurement points constituted by a predetermined number of measurement points arranged along the first direction, and determining an image recording position and an image size on the basis of the first accumulated value of the density variation amounts of the plurality of first rows of measurement points, the second accumulated value of the density variation amounts of the plurality of second rows of measurement points, and the positions of the first and second rows of measurement points on the photographic film. Therefore, a boundary position of the image along the first direction can be determined with high accuracy by determining a portion having a first row of measurement points having the maximum accumulated value of density variation amounts in the plurality of first rows of measurement points as a boundary of the image along the first direction, and a boundary position of the image along the second direction can be determined with high accuracy by determining a portion having a second row of measurement points having the maximum accumulated value of density variation amounts in the plurality of second rows of measurement points as a boundary of the image along the second direction.

23 Claims, 14 Drawing Sheets

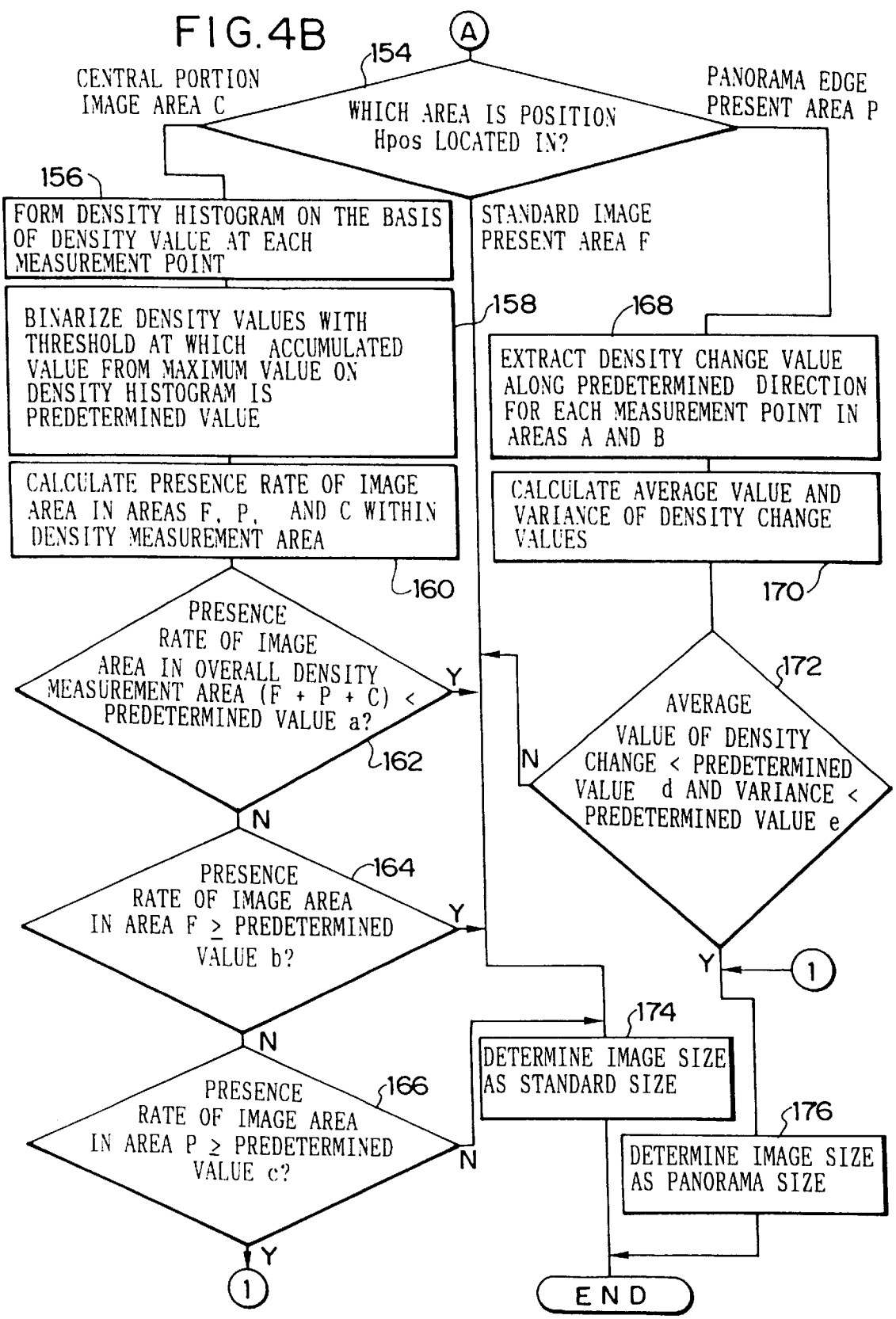

FIG. 6A
STANDARD SIZE IMAGE RECORDED ON NEGATIVE FILM

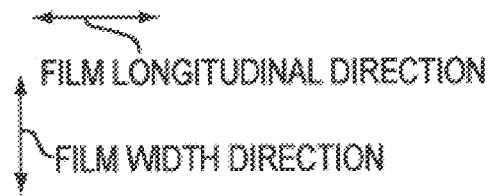

FIG. 6B
IMAGE REPRESENTING DENSITY CHANGE VALUE

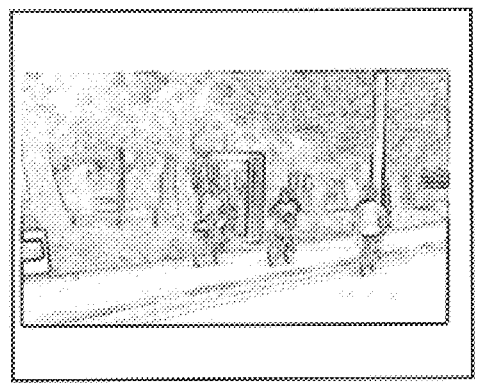

FIG. 6C
ACCUMULATED VALUE OF DENSITY CHANGE IN FILM WIDTH DIRECTION FOR MEASUREMENT POINT STRINGS ARRANGED ALONG FILM LONGITUDINAL DIRECTION

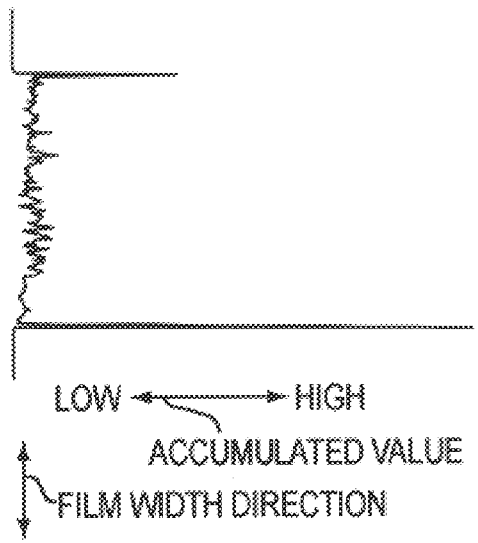

FIG. 6D
ACCUMULATED VALUE OF DENSITY CHANGE IN FILM LONGITUDINAL DIRECTION FOR MEASUREMENT POINT STRINGS ARRANGED ALONG FILM WIDTH DIRECTION

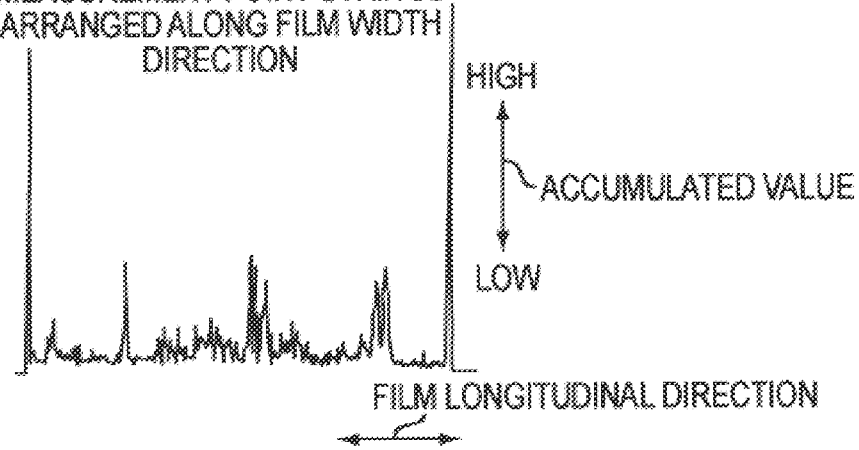

FIG. 7A
PANORAMA SIZE IMAGE RECORDED ON NEGATIVE FILM

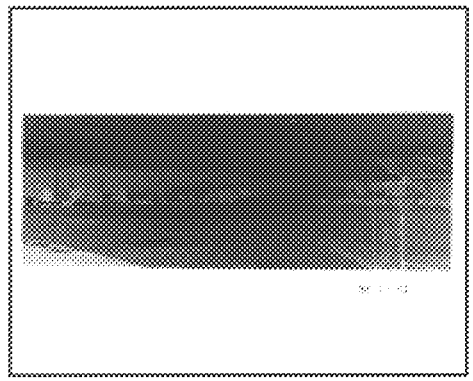

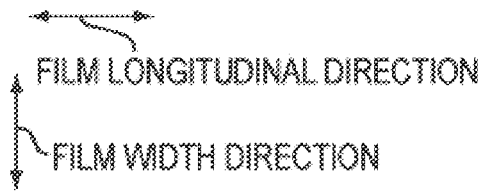
FILM LONGITUDINAL DIRECTION
FILM WIDTH DIRECTION

FIG. 7B
IMAGE REPRESENTING DENSITY CHANGE VALUE

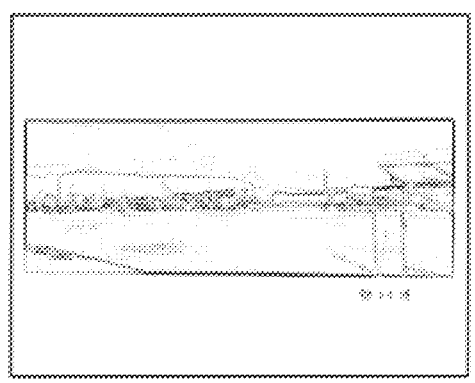

FIG. 7C
ACCUMULATED VALUE OF DENSITY CHANGE IN FILM WIDTH DIRECTION FOR MEASUREMENT POINT STRINGS ARRANGED ALONG FILM LONGITUDINAL DIRECTION

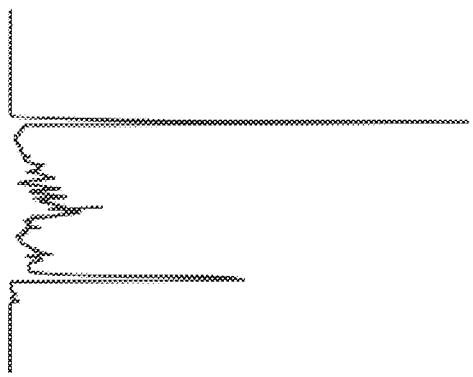

LOW ←→ HIGH
ACCUMULATED VALUE
FILM WIDTH DIRECTION

FIG. 7D
ACCUMULATED VALUE OF DENSITY CHANGE IN FILM LONGITUDINAL DIRECTION FOR MEASUREMENT POINT STRINGS ARRANGED ALONG FILM WIDTH DIRECTION

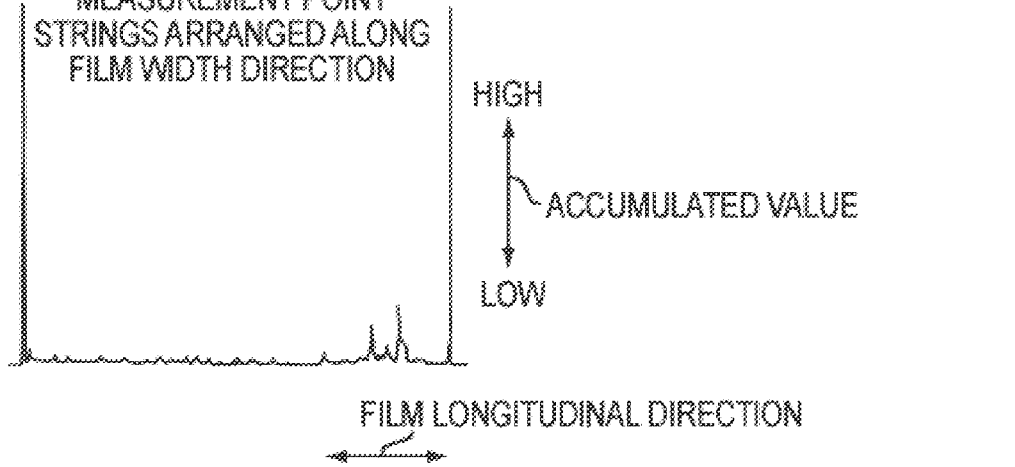

HIGH
ACCUMULATED VALUE
LOW

FILM LONGITUDINAL DIRECTION

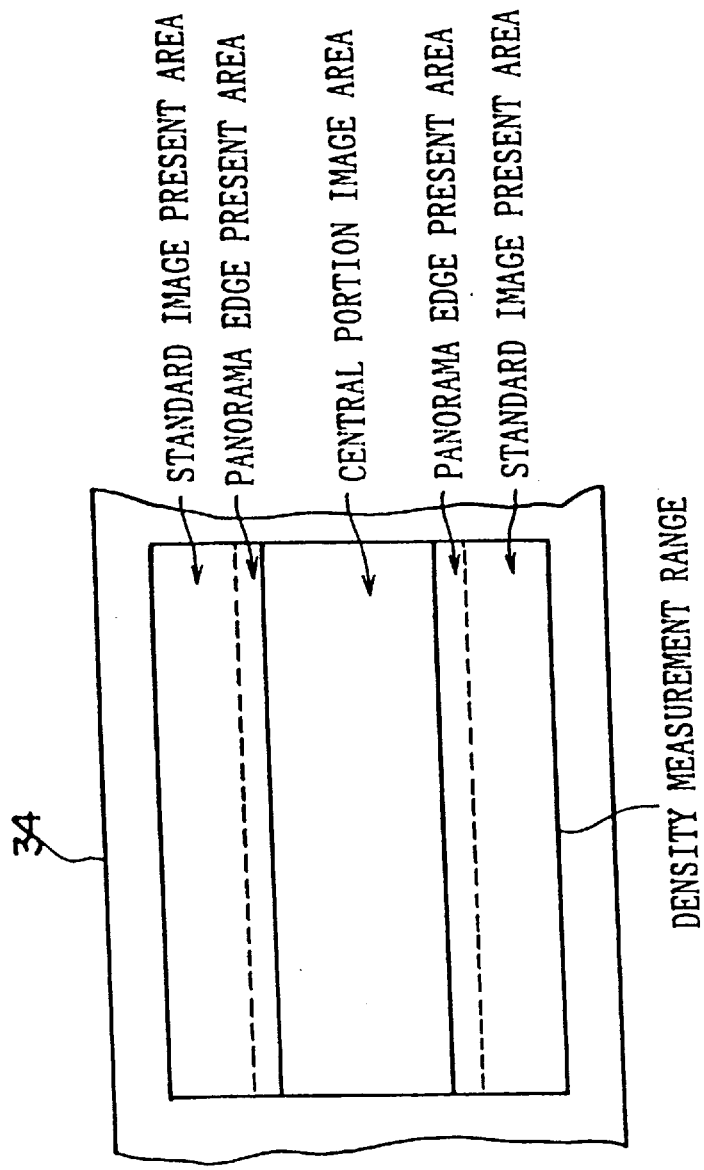

FIG. 9A
STANDARD SIZE IMAGE OF FIREWORK
SCENE RECORDED ON NEGATIVE FILM

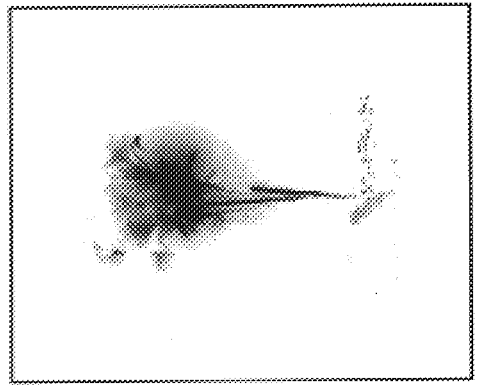

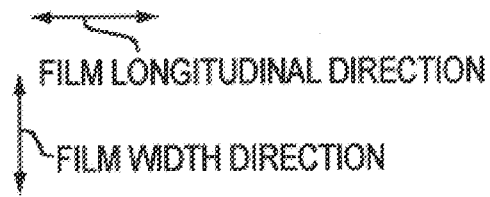

FIG. 9B
IMAGE REPRESENTING DENSITY
CHANGE VALUE

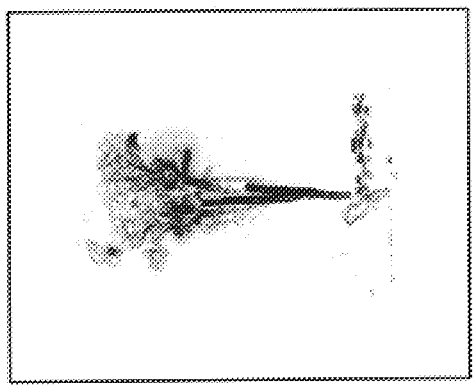

FIG. 9C
ACCUMULATED VALUE OF DENSITY
CHANGE IN FILM WIDTH
DIRECTION FOR MEASUREMENT
POINT STRINGS ARRANGED ALONG
FILM LONGITUDINAL DIRECTION

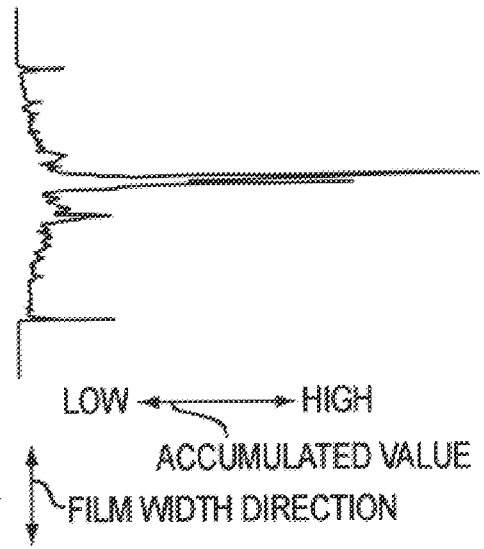

FIG. 9D
ACCUMULATED VALUE OF DENSITY CHANGE
IN FILM LONGITUDINAL DIRECTION
FOR MEASUREMENT POINT STRINGS
ARRANGED ALONG
FILM WIDTH DIRECTION

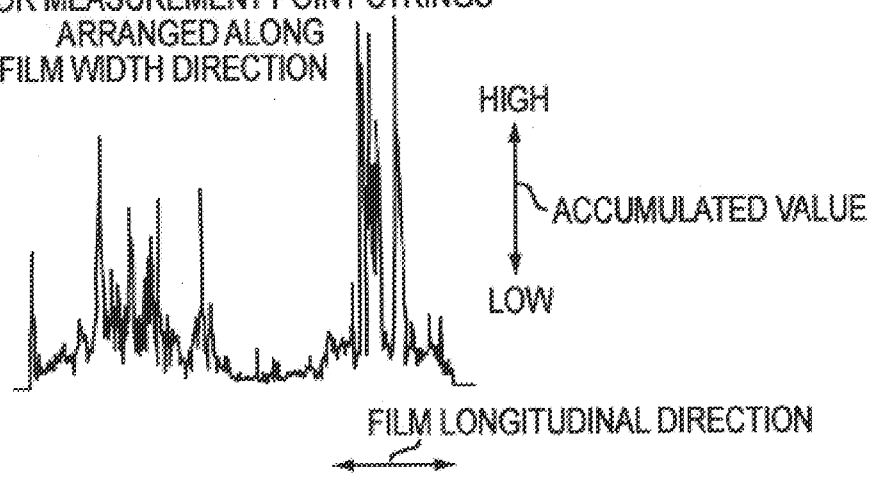

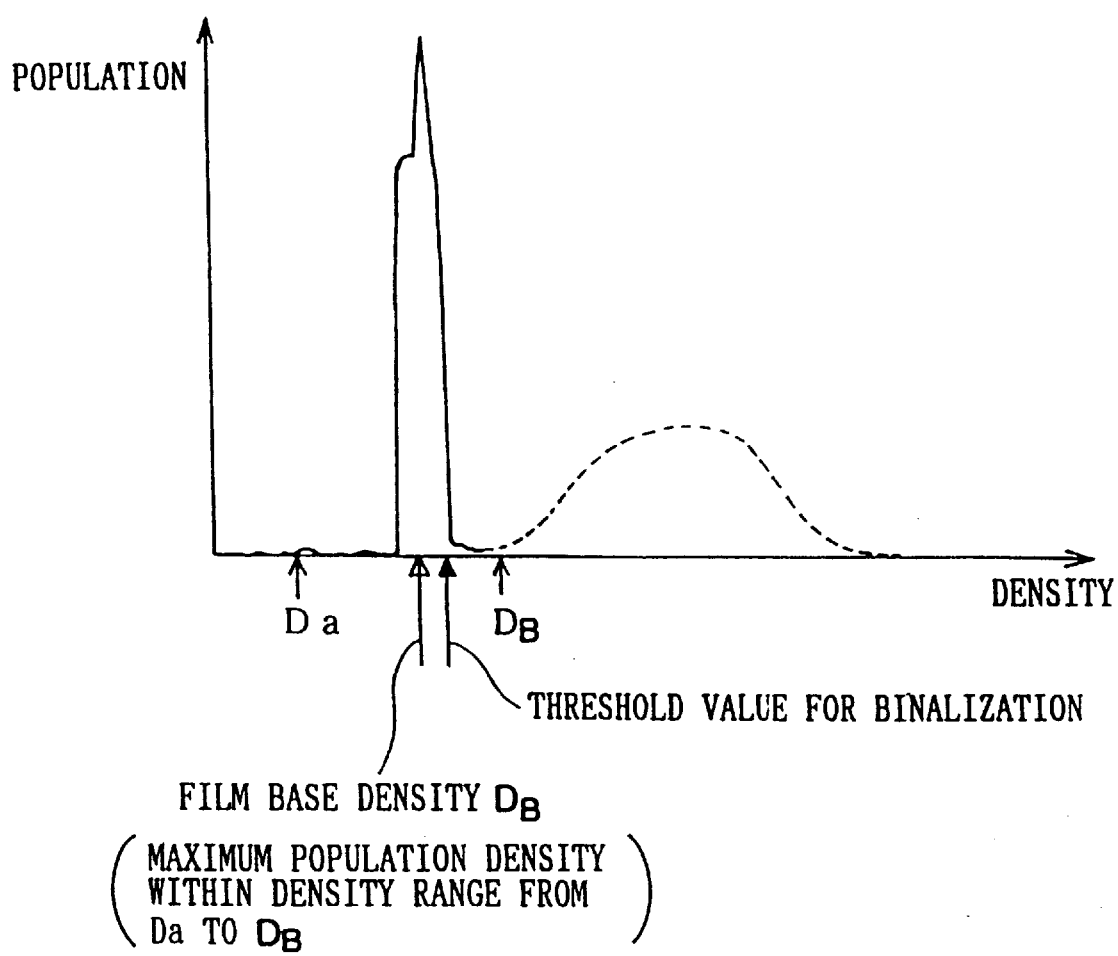

PANORAMA SIZE IMAGE RECORDED ON NEGATIVE FILM

BINALIZED IMAGE

BINALIZATION →

STANDARD SIZE IMAGE RECORDED ON NEGATIVE FILM

BINALIZED IMAGE

BINALIZATION →

MEASUREMENT AND CALCULATION RESULT OF AVERAGE VALUE AND VARIANCE OF DENSITY CHANGE AMOUNT IN AREA A AND B FOR STANDARD SIZE IMAGE

MEASUREMENT AND CALCULATION RESULT OF AVERAGE VALUE AND VARIANCE OF DENSITY CHANGE AMOUNT IN AREA A AND B FOR STANDARD SIZE IMAGE

5,875,022

FILM IMAGE DETECTION DEVICE AND METHOD

FIELD OF THE INVENTION

The present invention relates to a film image detection device and a method and, more particularly, to a film image detection method for detecting the recording position and image size of an image recorded on a photographic film and a film image detection device to which the film image detection method can be applied.

DESCRIPTION OF THE RELATED ART

In recent years, a camera in which images having different frame sizes (e.g., a standard size, a panorama size, or the like) can be recorded in one photographic film has been commercially available. In a photographic processing step of performing various processes to a photographic film such as a negative film, processing contents must be changed depending on the frame size of an image recorded on the photographic film. For example, in a photographic printing step of printing an image recorded on a negative film to a printing paper, switching a masking range, a change in printing magnification, a change in size of a printing paper, and the like must be performed depending on the image size. For this reason, in order to automatically perform a processing step such as a photograph printing step to a photographic film on which images having different sizes are recorded, the size of each image recorded on the photographic film must be detected automatically. Conventionally, various detection methods have been proposed.

As an example, Japanese Patent Application Laid-Open (JP-A) No. 4-350643 and 4-303833 disclose the following technique. That is, a first sensor for detecting the density of a portion corresponding to a recording area of an image having a panorama size and a second sensor for detecting the density of a predetermined area corresponding to a portion outside the recording area of the image having a panorama size and within a recording area of an image having a standard size are arranged along the transverse direction of the negative film (i.e., direction perpendicular to the direction in which the negative film is fed), and an image size is determined as a panorama size when the density detected by the second sensor is the base density of the negative film.

Japanese Patent Application Laid-Open (JP-A) No. 5-323464 discloses the following technique. That is, the presence/absence of a boundary image at a position corresponding to a boundary of an image having a panorama size is detected, data indicating the presence of the boundary image is accumulated along the direction in which a negative film is fed, and the accumulated value is compared with a predetermined value. If the accumulated value is equal to or larger than the predetermined value, an image is determined as an image having a panorama size.

However, when an image is of the standard size and is recorded on a negative film in an underexposure condition, the density of a predetermined area corresponding to a portion of the negative film, the portion being provided outside a recording area of a panorama-size image and within a recording area of a standard-size image, becomes a very small value which is close to the base density. When an image is of the panorama size and has fogging or the like outside the recording area of the panorama-size image due to a failure of a camera, the density of the portion on the negative film outside the recording area of the panorama-size image becomes a value which is considerably different from the base density. In the technique described in Japanese Patent Application Laid-Open (JP-A) No. 4-350643 and 4-303833, since an image size is determined on the basis of the density of the predetermined area, the size of the image described above may be erroneously determined.

In Japanese Patent Application Laid-Open (JP-A) No. 5-323464, how to detect the presence/absence of a boundary image is not described specifically. However, since it is described therein that detection of the presence/absence of the boundary image means detection of a portion (edge portion) where an image signal suddenly changes, it can be determined that a portion where a change in density of an image is equal or larger than a predetermined value is set as a boundary image. However, the magnitude of the change in density in the boundary portion of the image is influenced by the overall density and gradation of the image. For example, an image recorded on a negative film in an underexposure condition entirely has low density and low gradient, and the magnitude of a change in density in the image boundary is small.

For this reason, it is difficult to set a proper value as the threshold value of a change in density. When a portion where a change in density which is equal or larger than a constant value fixedly determined in advance occurs is to be determined as a boundary image, boundary images of a large number of images recorded on a negative film in an underexposure condition cannot be detected, and an image size may be correctly determined. In addition, detection of a boundary position of an image is also performed when a negative film is fed to position an image recorded on the negative film to an exposure position in the photographic printing step or the like. In this case, when the boundary image detection method described in the above publications is used to position the image to the exposure position, it is difficult for the same reason as described above to position the image with high accuracy.

The accumulated value of data indicating the presence of a boundary image in the above-described JP-A No. 5-323464 represents the length of the data being accumulated in the direction in which the film is fed, i.e., a length of the boundary image being present along the boundary position of the panorama-size image, and this length is compared with a predetermined value (e.g., 5 mm) representing a length to determine an image size. For this reason, there is a high probability that an image which is of a standard size but has a portion, near a position corresponding to the boundary of the panorama-size image, where a change in density occurs over a predetermined length and substantially parallel to the boundary of the image is erroneously determined as a panorama-size image.

In JP-A No. 5-323464, it is determined whether an image is present in a predetermined area corresponding to a portion of the negative film, which is provided outside the recording range of a panorama-size image and within a recording range of a standard-size image to compensate for determination of an image size based on the presence/absence of the boundary image. However, any concrete method for determining the presence/absence of the image does not described in JP-A No. 5-323464. This determination is generally performed by determining whether a portion having a density higher than a predetermined density is present in the area. However, according to this determination, there is a high probability that an image having fogging or the like occurring outside the recording range of the panorama-size image is erroneously determined as a standard-size image.

SUMMARY OF THE INVENTION

The present invention has been made in consideration of the above-described circumstances, and an object thereof is to provide a film image detection device capable of easily detecting the size of an image recorded on a photographic film and an image recording position with high accuracy, and a film image detection method.

In order to achieve the above-described object, a film image detection device according to the first aspect of the present invention comprises density measurement means for measuring densities at a large number of measurement points arranged along a first direction and a second direction crossing the first direction in a measurement area including an image recording range on a photographic film on which an image is recorded, density variation amount calculation means for calculating density variation amounts at the measurement points along the first and second directions on the basis of the densities at the measurement points in the measurement area measured by the density measurement means, accumulation means for accumulating the density variation amounts at the measurement points along the first direction calculated by the density variation amount calculation means for each of a plurality of first rows of measurement points constituted by a predetermined number of measurement points arranged along the second direction, and for accumulating the density variation amounts at the measurement points along the second direction for each of a plurality of second rows of measurement points constituted by a predetermined number of measurement points arranged along the first direction, and determination means for determining an image recording position and an image size on the basis of the accumulated value of the density variation amounts of the plurality of first rows of measurement points obtained by the accumulation means, the accumulated value of the density variation amounts of the plurality of second rows of measurement points obtained by the accumulation means, and the positions of the first and second rows of measurement points on the photographic film.

According to the first aspect described above, densities at a large number of measurement points arranged along a first direction and a second direction crossing the first direction in a measurement area including an image recording range on a photographic film on which an image is recorded are measured by the density measurement means, the density variation amount calculation means calculates density variation amounts at the measurement points along the first and second directions on the basis of the densities at the measurement points in the measurement area, and the accumulation means integrates the density variation amounts at the measurement points along the first direction calculated by the density variation amount calculation means for each of a plurality of first rows of measurement points constituted by a predetermined number of measurement points arranged along the second direction, and integrates the density variation amounts at the measurement points along the second direction for each of a plurality of second rows of measurement points constituted by a predetermined number of measurement points arranged along the first direction.

In general, when an amount of exposure of an image to a photographic film changes, the density and gradation of the image recorded on the photographic film change, and, accordingly, the accumulated value of density variation amounts changes. However, the changes in density and gradation of the image caused by a change in amount of exposure is an entire change in which the density and gradation uniformly change over the entire image. The accumulated value of the density variation amounts of rows of measurement points is entirely changed with the entire changes in density and gradation. For this reason, even if an image is recorded on the photographic film in an underexposure condition, the position of a first row of measurement points, of a plurality of rows of measurement points, having the maximum accumulated value of density variation amounts and a second row of measurement points, of a plurality of second rows of measurement points, having the maximum accumulated value of density variation amounts do not change. The present inventor confirmed by an experiment that, in a general image, of accumulated values of the density variation amounts of rows of measurement points constituted by a predetermined measurement points arranged in the same direction, the accumulated value of the density variation amounts of a row of measurement points corresponding to a boundary position of the image is maximum.

When a change in density occurs substantially parallel to the boundary of an actual image at a position corresponding to an image boundary in an image size different from an actual image size in the image, the accumulated value of density variation amounts of the row of measurement points corresponding to the portion becomes relatively large. In order to make this accumulated value larger than the accumulated value of density variation amounts of a row of measurement points corresponding to the boundary of the actual image, although depending on the magnitude of the density variation amount in the boundary of the actual image, the density variation amount in the change in density must be relatively large and must continuously occur by a predetermined length or more parallel to the boundary of the actual image. An image in which such a change in density occurs is rarely recorded on a photographic film.

When a portion exposed by fogging is present outside the recording range of the actual image, the accumulated value of the density variation amounts of a row of measurement points corresponding to a boundary between the portion exposed by fogging and an unexposed portion is relatively large. In order to make the accumulated value larger than the accumulated value of the density variation amounts of a row of measurement points corresponding to the boundary of the actual image, although depending on the magnitude of the density variation amount in the boundary of the actual image, the boundary between the exposed portion and the unexposed portion must be parallel to the boundary of the actual image. An image in which the portion exposed as described above is present is rarely recorded on a photographic film.

Therefore, on the basis of an accumulated value of density variation amounts of a plurality of first rows of measurement points obtained by an accumulation means, an accumulated value of density variation amounts of a plurality of rows of measurement points obtained by the accumulation means, and the positions of the first and second rows of measurement points on a photographic film, a determination means determines, as the boundary of an image along a first direction, the position of a first row of measurement points having the maximum accumulated value of density variation amounts of the plurality of first rows of measurement points. In this case, the position of the image boundary along the first direction can be determined with high accuracy. When the determination means determines, as the boundary of an image along a second direction, the position of a second row of measurement points having the maximum accumulated value of density variation amounts of the plurality of second rows of measurement points. In this case, the position of the image boundary along the second direction can be determined with high accuracy.

When images are recorded on a photographic film such that the positions of the predetermined boundaries of the images having different sizes and recorded on the photographic films are located at different positions along a direction perpendicular to a direction in which the predetermined boundaries extend, if the first or second direction substantially coincides with the direction in which the position of the predetermined boundary changes, the size of the image and an image recording position along the predetermined direction can be determined on the basis of the position of the boundary of the image determined as described above. In addition, with respect to a direction of the first and second directions which does not substantially coincide with the direction in which the position of the predetermined boundary changes, by using determination result of the position of the boundary of the image along the direction, the image recording position along the direction can be determined.

In this manner, according to this aspect, without specifically determining the threshold value of a density variation amount, on the basis of a density value measured by a single density concentration measurement means, the boundary position of an image along the first direction and the boundary position of an image along the second direction can be determined with high accuracy. For this reason, the size of an image recorded on a photographic film and an image recording position can be easily detected with high accuracy, and the arrangement of the film detection device can be simplified.

A film image detection method according to the second aspect comprises the steps of measuring densities at a large number of measurement points arranged along a first direction and a second direction crossing the first direction in a measurement area including an image recording range on a photographic film on which an image is recorded, calculating density variation amounts at the measurement points along the first and second directions on the basis of the densities at the measurement points in the measured measurement area, accumulating the calculated density variation amounts at the measurement points along the first direction for each of a plurality of first rows of measurement points constituted by a predetermined number of measurement points arranged along the second direction, and for accumulating the density variation amounts at the measurement points along the second direction for each of a plurality of second rows of measurement points constituted by a predetermined number of measurement points arranged along the first direction, and determining an image recording position and an image size on the basis of the accumulated value of the density variation amounts of the plurality of first rows of measurement points, the accumulated value of the density variation amounts of the plurality of second rows of measurement points, and the positions of the first and second rows of measurement points on the photographic film.

According to the second aspect, densities at a large number of measurement points arranged along a first direction and a second direction crossing the first direction in a measurement area including an image recording range on a photographic film on which an image is recorded are measured, density variation amounts at the measurement points along the first and second directions on the basis of the densities at the measurement points in the measured measurement area are calculated, the calculated density variation amounts at the measurement points along the first direction for each of a plurality of first rows of measurement points constituted by a predetermined number of measurement points arranged along the second direction, and for accumulating the density variation amounts at the measurement points along the second direction for each of a plurality of second rows of measurement points constituted by a predetermined number of measurement points arranged along the first direction are accumulated, and an image recording position and an image size on the basis of the accumulated value of the density variation amounts of the plurality of first rows of measurement points, the accumulated value of the density variation amounts of the plurality of second rows of measurement points, and the positions of the first and second rows of measurement points on the photographic film are determined. For this reason, as in the first aspect, the size of an image recorded on a photographic film and an image recording position can be easily detected with high accuracy.

BRIEF DESCRIPTION OF THE DRAWINGS

FIG. 4B is a flow chart for explaining an image-position/size determining process;

FIG. 6A shows an example of a standard-size image recorded on a negative film;

FIG. 6B is a view showing an image representing a calculation result of the density variation value in FIG. 6A;

FIG. 6C is a graph showing a result obtained by accumulating density variation values along a transverse direction of the film for each row of measurement points arranged in a longitudinal direction of the film;

FIG. 6D is a graph showing a result obtained by accumulating density variation values along a longitudinal direction of the film for each row of measurement points arranged in a transverse direction of the film;

FIG. 7A shows an example of a panorama-size image recorded on a negative film;

FIG. 7B is a view showing an image representing a calculation result of the density variation value in FIG. 7A;

FIG. 7C is a graph showing a result obtained by accumulating density variation values along a transverse direction of the film for each row of measurement points arranged in a longitudinal direction of the film;

FIG. 7D is a graph showing a result obtained by accumulating density variation values along a longitudinal direction of the film for each row of measurement points arranged in a transverse direction of the film;

FIG. 8 is a plan view of a negative film showing the ranges of a standard-size image existing area F, a panorama-size edge existing area P, and a central portion image area C within a density measurement area;

FIG. 9A shows an example of a standard-size image recorded on a negative film by photographing a firework scene;

FIG. 9B is a view showing an image representing a calculation result of the density variation value in FIG. 9A;

FIG. 9C is a graph showing a result obtained by accumulating density variation values along a transverse direction of the film for each row of measurement points arranged in a longitudinal direction of the film;

FIG. 9D is a graph showing a result obtained by accumulating density variation values along a longitudinal direction of the film for each row of measurement points arranged in a transverse direction of the film;

FIG. 10 is a graph showing a histogram of a density value at each measurement point used for determining a threshold value in binarization;

DESCRIPTION OF THE EMBODIMENT

Figure 1:
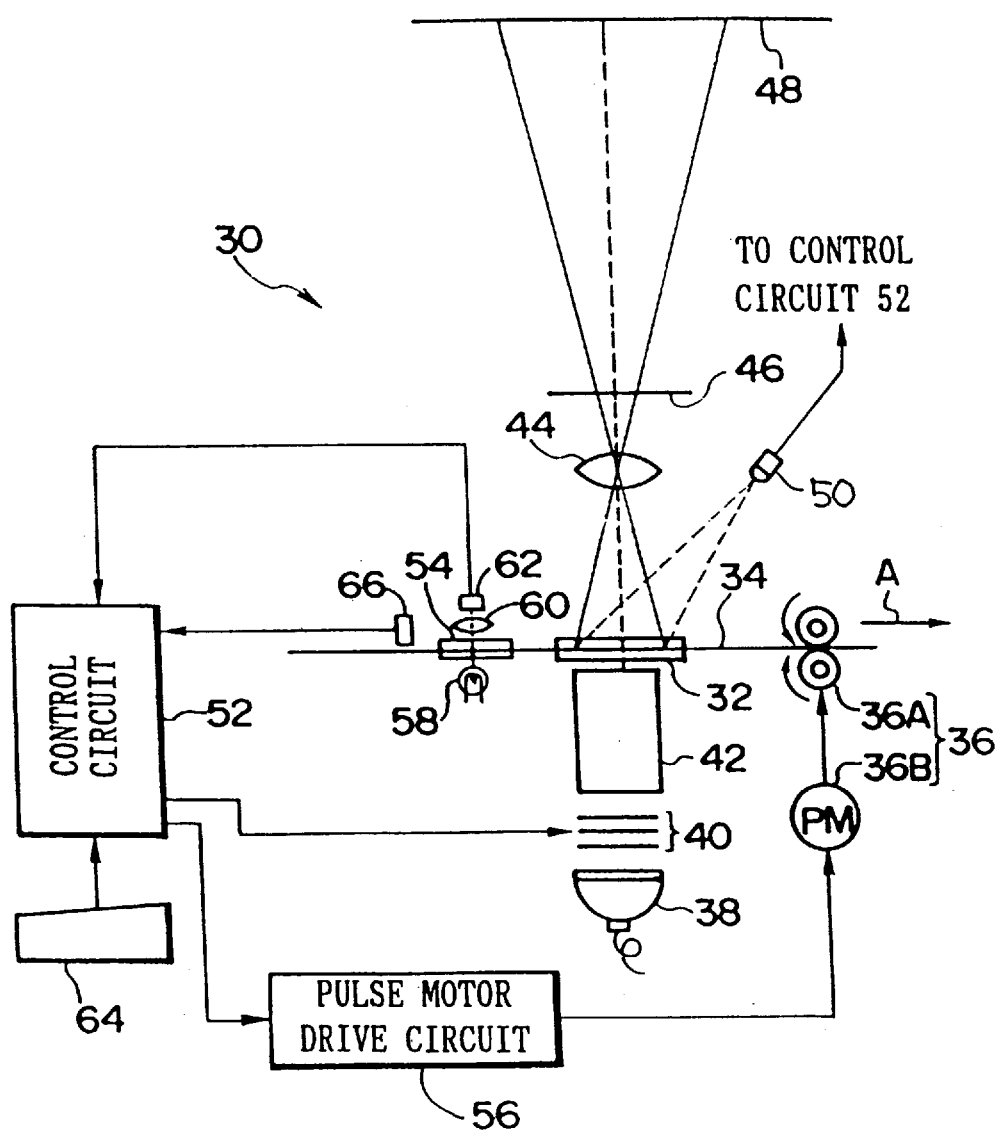
FIG. 1 is a schematic structural view of a photographic printing apparatus according to an embodiment of the present invention.

An embodiment of the present invention will be described below with reference to the accompanying drawings. FIG. 1 shows a photographic printing apparatus 30 comprising a film image detection device according to the present invention. In the photographic printing apparatus 30, a lamp house 38 serving as an exposure light source having a halogen lamp and a reflector for reflecting light rays emitted from the halogen lamp upward is disposed. A light-adjusting filter section 40 having C (cyan), M (magenta), and Y (yellow) light-adjusting filters and a light-diffusion box 42 are sequentially arranged above the lamp house 38.

An exposure stage 32 through which a developed negative film 34 (corresponding to a photographic film of the present invention) set in the photographic printing apparatus 30 passes is provided above the light-diffusion box 42. A lens 44, a black shutter 46, and a photographic printing paper 48 are sequentially arranged above the exposure stage 32. The exposure stage 32 includes a variable negative mask (not shown) having an opening whose size can be changed depending on the size of an image recorded on the negative film 34. Light rays emitted from the lamp house 38 and passing through the light-adjusting filter section 40 and the light-diffusion box 42 is transmitted through the developed negative film 34 via the opening of the variable negative mask, so as to form an image on the printing paper 48 by the lens 44.

Obliquely above the exposure stage 32, a photometer 50 provided to be inclined with respect to the optical axis of the light rays emitted from the lamp house 38 is disposed at a position where the photometer 50 can photometrically measure an image recorded on the negative film 34. The photometer 50 is constituted by a two-dimensional image sensor or the like. The photometer 50 divides the image recorded on the negative film 34 into a plurality of pixels, resolves the light rays passing through each pixel into R, G, and B component colors, and measures the quantity of light of each component color light. Although not shown, the photometer 50 is connected to a control circuit 52, and outputs a photometric value obtained by the measurement to the control circuit 52.

A feeding section 36 and a photometric stage 54 are respectively disposed adjacent to the exposure stage 32 in such a manner as to sandwich the exposure stage 32 therebetween. The feeding section 36 includes a pair of feeding rollers 36A for holding the negative film 34 therebetween and a pulse motor 36B for rotating the feeding rollers 36A. The pulse motor 36B rotates the feeding rollers 36A to feed the negative film 34 in the direction indicated by an arrow A in FIG. 1. The pulse motor 36B is connected to the control circuit 52 through a pulse motor drive circuit 56.

Figure 2:
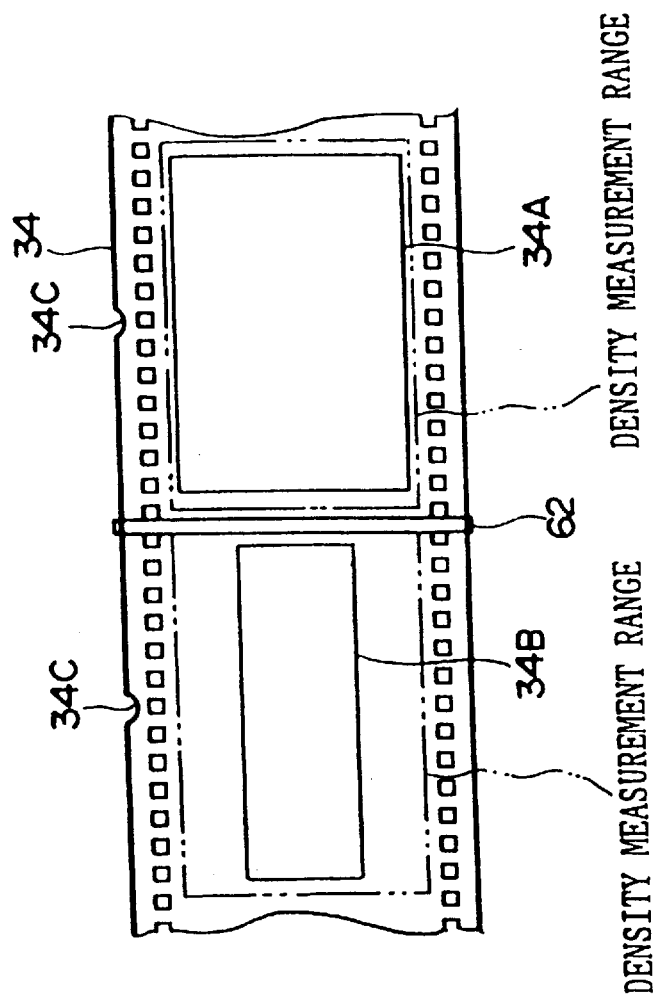
FIG. 2 is a plan view showing a negative film and a line sensor.

A light source lamp 58 is disposed below the photometric stage 54, and a lens 60 and a line sensor 62 serving as the density measurement means of the present invention are sequentially arranged above the photometric stage 54. As shown in FIG. 2, the line sensor 62 is constituted by arranging a large number of light-receiving elements in a predetermined direction which coincides with the transverse direction of the negative film 34. A rectangular opening corresponding to the line sensor 62 and having a longitudinal direction which coincides with the direction in which the light-receiving elements of the line sensor 62 are arranged is formed in the photometric stage 54. Light rays emitted from the light source lamp 58 pass through the negative film 34 via the opening, so as to form an image on the light-receiving surface of each light-receiving element of the line sensor 62 by the lens 60.

The line sensor 62 is provided to measure quantities of light passing through different portions of the negative film 34 by the light-receiving elements. The line sensor 62 is connected to the control circuit 52, and outputs photometric values obtained by the measurement to the control circuit 52. The control circuit 52 includes a microcomputer having a CPU and a memory such as a ROM or a RAM, and a keyboard 64 for inputting various data, commands, or the like is connected to the control circuit 52.

The function of the present embodiment will be described below. As shown in FIG. 2, in addition to a standard-size (so-called full-size) image 34A, an image 34B (in this embodiment, a panorama-size image) having the same longitudinal dimension as that of the standard-size image and an aspect ratio smaller than that of the standard-size image are recorded on the developed negative film 34 according to this embodiment. In the photographic printing apparatus 30, one of a negative film on which only the standard-size image 34A is recorded, a negative film on which the panorama-size image 34B is recorded, and a negative film on which the standard-size image 34A and the panorama-size image 34B are recorded is set.

Figure 3:
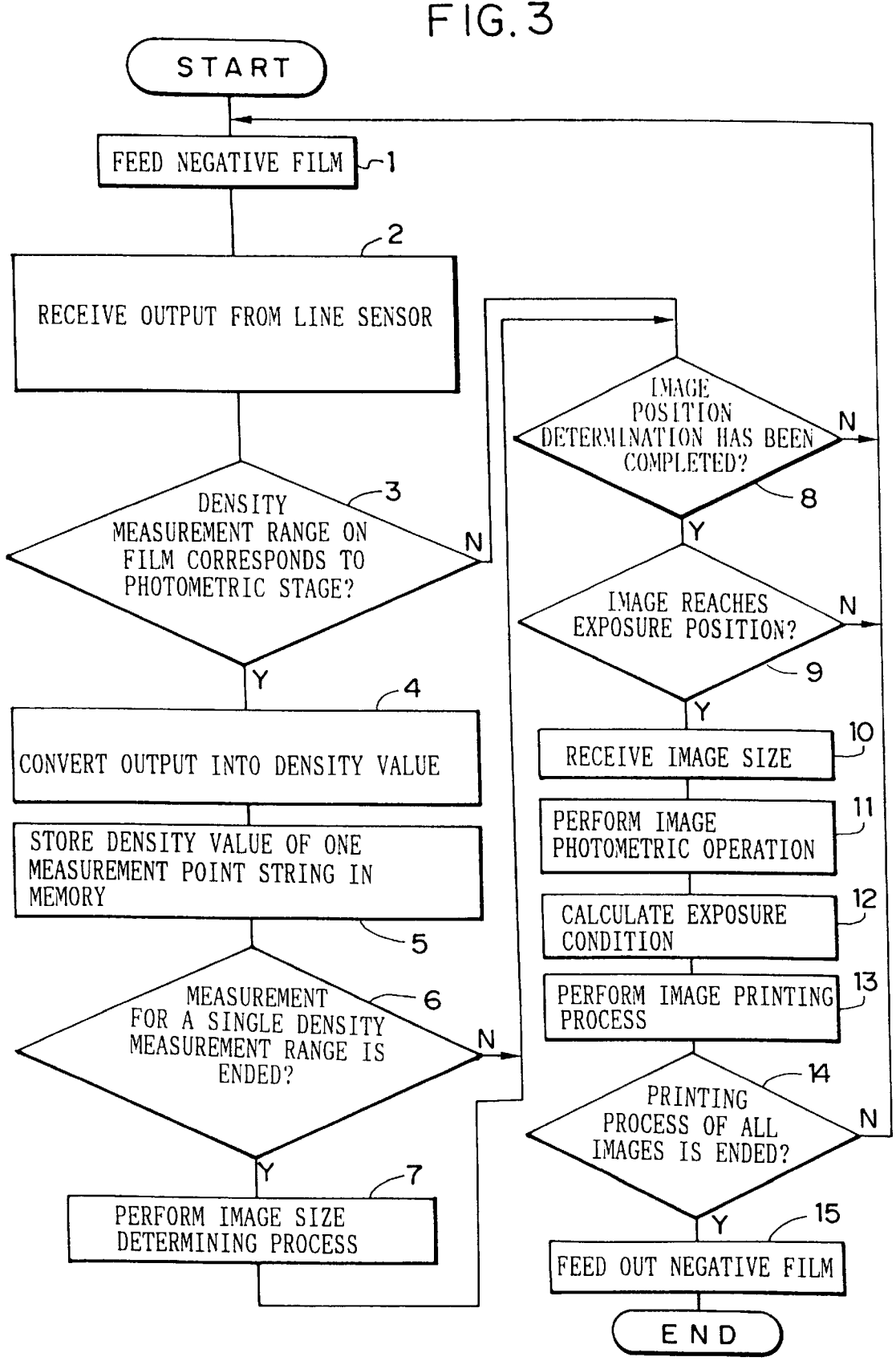
FIG. 3 is a flow chart for explaining a measuring process of the density of a negative film and a printing process.

Measurement of the density of a negative film performed by the photometric stage 54 will be described below with reference to the flow chart in FIG. 3. Note that the process shown in FIG. 3 is executed by the control circuit 52 when the developed negative film 34 is set in the photographic printing apparatus 30 and an instruction for execution of a printing process is issued.

In step 100, the pulse motor 36B is driven through the pulse motor drive circuit 56 to feed the negative film 34. In step 101, a photometric value output from the line sensor 62 is fetched. In step 102, it is determined on the basis of the photometric value fetched in step 101 whether the density measurement area of the negative film 34 which is larger than the image recording ranges of the standard-size image 34A and the panorama-size image 34B as indicated by an imaginary line in FIG. 2 and includes the image recording ranges corresponds to the photometric stage 54 (the details of determination in step 102 will be described later).

If NO in step 102, it is determined in step 104 whether determination of an image position has been completed. The determination of the image position is performed in an image-position/size determining process (to be described later). For this reason, at this time, NO is determined in step 104, the process returns to step 100 to continuously perform the feeding operation of the negative film 34.

The determination in step 102 is performed as follows. That is, a change in photometric value fetched from the line sensor 62 is monitored while keeping the feeding operation of the negative film 34 in step 100, the maximum point of a photometric value in a predetermined range is specified, the predetermined range being estimated to have a high probability of the boundary of a density measurement area existing on the negative film 34. Since a portion where the maximum photometric value is obtained on the negative film 34 has a density value smaller than that around the portion, there is a great possibility of the portion being an unexposed portion between a plurality of images recorded on the negative film 34. For this reason, when the fetched photometric value slightly becomes smaller than the photometric value at the maximum point (e.g., about 90 to 95%), it is determined that the boundary portion of the density measurement area corresponds to the line sensor 62. In a period of time from this time to when the negative film 34 is fed by the length corresponding to density measurement area along the longitudinal direction of the negative film 34, it is determined that the density measurement area corresponds to the line sensor 62 (YES is determined in step 102).

When an image is present further on the upstream side of the feeding direction of the negative film 34 than an image corresponding to the density measurement area to be determined, the position of the predetermined range which is estimated to have a high probability of the boundary of the density measurement area existing can be fixed on the basis of the position of the image which is present on the upstream side because the position of the image which is present on the upstream side is determined with high accuracy by the image position/size determining process (to be described later). Even if no image is present further on the upstream side in the feeding direction of the negative film 34 than the image corresponding to the density measurement area to be determined, for example, a range following a position spaced apart from the leading end of the negative film 34 by a predetermined distance can be set as the predetermined range.

If YES in step 102, the photometric value fetched in step 101 is the photometric value at each of a plurality of measurement points arranged along the transverse direction of the film in the density measurement area. For this reason, the process is shifted to step 106 to convert the fetched photometric value into a density value, and, in step 108, the density value obtained by the conversion is stored in a memory 53 of the control circuit 52 as the density value at each of the measurement points constituting a single row of measurement points. In step 110, it is determined whether measurement for a single density measurement range has been ended. If NO in step 110, the process proceeds to step 104.

The processes in steps 100, 101, 106, and 108 are repeated until the density values at all the measurement points in the single density measurement area are stored. If YES in step 110, the image-position/size determining process is effected in step 112, and the process proceeds to step 104.

Figure 4A:
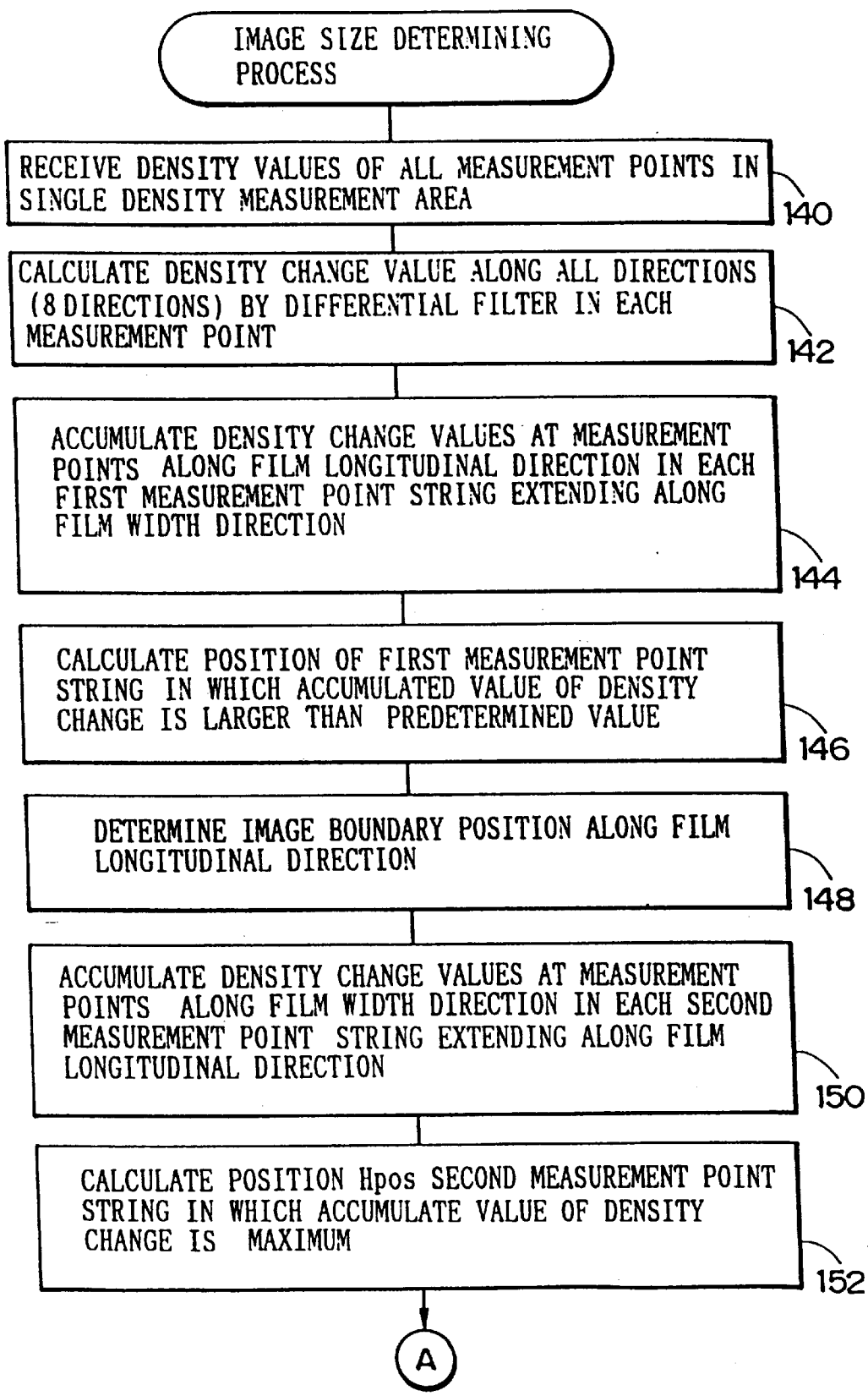
FIG. 4A is a flow chart for explaining an image-position/size determining process.

This image-position/size determining process will be described below with reference to the flow chart in FIGS. 4A and 4B. In step 140, the density values at all the measurement points in the single density measurement area are fetched. In step 142, density variation values along directions (total of eight directions: indicated as eight arrows having different directions) from each measurement point to eight measurement point therearound are calculated by using differential filters. Note that this process corresponds to a means for calculating a density variation amount according to the present invention. The eight differential filters for respectively calculating the density variation values along the eight directions are shown in FIG. 5 as an example.

Figure 5:
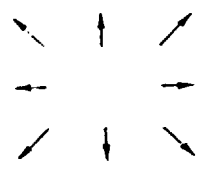
FIG. 5 is a conceptual view showing an example of a differential filter for calculating a density variation value.

For example, when a density variation value along a predetermined direction is to be calculated, a differential filter indicated by an arrow of the predetermined direction in the eight arrows shown in FIG. 5 is used, and the density value at a measurement point to be calculated and the density values at the eight measurement points (so-called eight-near measurement points) which are present around the measurement point to be calculated are respectively multiplied by the numerical value of the differential filter as a coefficient to calculate the sum of these values. In this manner, the density variation value along the predetermined direction can be calculated. Since the calculation is performed by eight differential filters corresponding to the respective directions, the density variation value along each direction at a single measurement point can be calculated.

As a reference, the above-described processes are performed for a standard-size image shown in FIG. 6A and a panorama-size image shown in FIG. 7A, and the resultant density variation values are converted into density values (the density value is increased with an increase in density variation value) and displayed as an image. In this case, images shown in FIGS. 6B and 7B are obtained. As is apparent from FIGS. 6B and 7B, it is understood that the edge (a portion where a density changes) of an original image is extracted by the above-described processes.

In step 144, the density variation values in two directions (e.g., right and left direction in FIG. 5) along the negative film longitudinal direction at measurement points are accumulated for each row of measurement points (which will be, for convenience, referred to as a first row of measurement points hereinafter) arranged along a transverse direction of the film. This process corresponds to an accumulation means of the present invention. In next step 146, the position, on the negative film 34, of the first row of measurement points in which the accumulated value of the density variation values is equal to or larger than a predetermined value is calculated. In next step 148, on the basis of the calculated position, the positions of the boundaries of both ends of the image in the film longitudinal direction are determined. This process corresponds to a determination means of the present invention.

For example, the density variation values of the images shown in FIGS. 6A and 7A are accumulated for each of the first rows of measurement points, of which results are shown in FIGS. 6D and 7D. As is apparent from FIGS. 6D and 7D, the accumulated values of density variation values at portions corresponding to the boundaries of both the ends of the image in the film longitudinal direction are large values. Therefore, the position of the first row of measurement points in which the accumulated value of density variation values is equal to or larger than the predetermined value can be regarded as the boundary of each of both the ends of the image in the film longitudinal direction.

Depending on the contents of a recorded image, the accumulated value of density variation values may be equal to or larger than the predetermined value in a large number of first rows of measurement points. However, according to this embodiment, the interval between the boundaries of both ends of each image in the film longitudinal direction is constant regardless of an image size. Therefore, on the basis of the interval between the boundaries of both the ends of an image (stored in memory in advance) in the film longitudinal direction, and an interval between a pair of the first rows of measurement points on the negative film, a pair of the first rows of measurement points which is estimated to correspond to the boundaries of the both ends of the image in the film longitudinal direction at high probability can be selected. The positions of the selected pair of first rows of measurement points can be set as the boundary positions of both ends of the image in the film longitudinal direction.

In next step 150, the density variation values in two directions (e.g., up and down direction in FIG. 5) along the transverse direction of the film at measurement points are accumulated for each row of measurement points (which will be, for convenience, referred to as a second row of measurement points hereinafter) arranged along a film longitudinal direction. This process also corresponds to an accumulation means of the present invention. For example, the results obtained by accumulating the density variation values for each of the second rows of measurement points with respect to the images shown in FIGS. 6A and 7A are as shown in FIGS. 6C and 7C, respectively. In step 152, a position $H_{POS}$, on the negative film 34, of the second row of measurement points in which the maximum accumulated value of density variation values can be obtained by the above calculation is calculated.

As shown in FIG. 8, according to this embodiment, the density measurement area is classified into a standard image existing area F, a panorama edge existing area P, and a central portion image area C in advance. The panorama edge existing area P is an area in which, when an image recorded on the negative film 34 is of a panorama size, the boundaries of the film transverse direction end portions of the image are located. The standard image existing area F is located outside the panorama edge existing area P in the film transverse direction, and is an area in which, when an image recorded on the negative film 34 is of a standard size, the image is located. The central portion image area C inside the panorama edge existing area P in the film transverse direction, and is an area in which an image is present regardless of its size. In next step 152, the process is branched depending on a specific area in which the position $H_{POS}$ calculated above is located.

When the position $H_{POS}$ is located in the standard image existing area F, it can be determined that an image is present in the standard image existing area F. For this reason, the process proceeds to step 174 to determine that the image recorded on the negative film 34 is of a standard size, and the image position/size determining process is ended.

On the other hand, the position $H_{POS}$ is located in the central portion image area C, the boundaries of the film transverse direction end portions of an image recorded on the negative film 34 are not clear, and a change in density in an area outside the central portion image area C does not occur or slightly occurs. For example, an image recorded on the negative film in an extremely underexposure condition, as shown in FIG. 9C, an image whose a background portion (edge portion of the image) has an extremely low density (FIG. 9A shows, as an example, an image obtained by photographing a firework scene), or the like is used. A result obtained by accumulating density variation values of each of the second rows of measurement points with respect to the image shown in FIG. 9A is shown in FIG. 9C. Therefore, it is understood that the position $H_{POS}$ of the second row of measurement points in which the accumulated value of density variation values is maximum is located in the central portion image area C.

In such a case, the process proceeds from step 154 to step 156, and a density histogram is formed on the basis of the density values at the measurement points (for example, see FIG. 10). In next step 158, a binary threshold value is determined by using the formed density histogram.

To determine the threshold value, a film base density value $D_B$ of the negative film 34 is calculated. As the base density value $D_B$, a density value having a maximum population in the density histogram in a density range (i.e., range from a density value Da to a density value Db in FIG. 10) in which a film base density value is estimated to be present regardless of the type of a negative film, the density range being determined by measuring the film base densities of various negative films in advance, can be set. Of the measurement points in the density measurement range, a total number n of measurement points each having a density value which is equal to or larger than the base density value $D_B$ is calculated. With reference to the maximum value of the density at each measurement point, a density value obtained when an accumulation value of the density values from the maximum value of the density in the prepared density histogram becomes a predetermined value (e.g., 0.9×n) smaller than the total number n can be used as a threshold value.

In step 158, the threshold value determined as described above is used to perform binarization for dividing the density measurement area into a non-image portion constituted by measurement points each having a density value smaller than the threshold value and an image portion constituted by measurement points each having a density value which is equal to or larger than the threshold value.

Figure 11A:
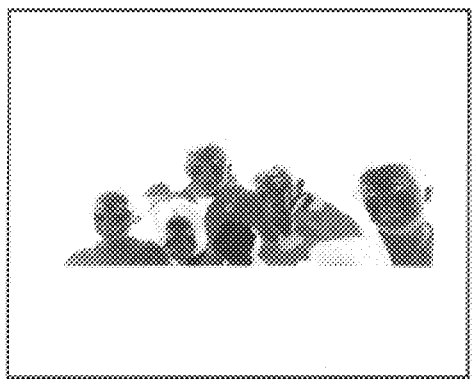
FIG. 11A shows a panorama-size image recorded on a negative film.
Figure 11B:
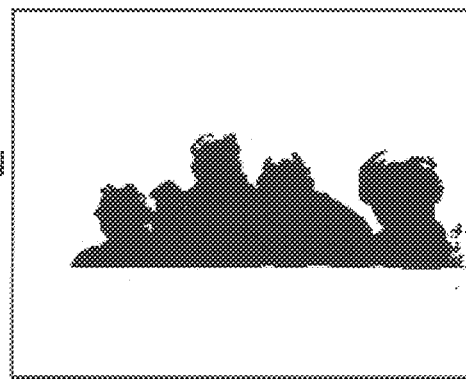
FIG. 11B shows a binary image obtained by binarizing the image in FIG. 11A.
Figure 11C:
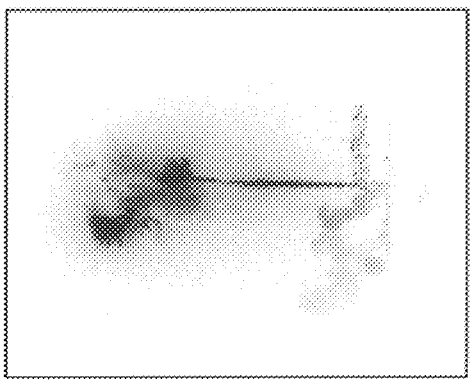
FIG. 11C shows an example of a standard-size image recorded on a negative film.
Figure 11D:
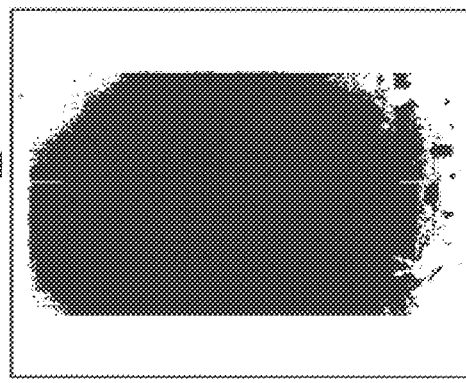
FIG. 11D shows a binary image obtained by binarizing the image in FIG. 1C.

With this binarization, a binary image shown in FIG. 11B is obtained from a panorama-size image shown in FIG. 11A, and a binary image shown in FIG. 11D is obtained from a standard-size image shown in FIG. 11C. Note that, in FIGS. 11B and 11D, an area classified as an image portion and an area classified as a non-image portion are indicated by black and white, respectively. The image shown in FIG. 11C is an image obtained by photographing a firework scene like the image shown in FIG. 9A. As shown in FIG. 11D, it is understood that a portion which almost coincides with an actual image recording range is extracted as an image portion by the binarization.

In step 160, in each of the standard image existing area F, the panorama edge existing area P, and the central portion image area C, an area rate (image existing rate) of a portion classified as an image portion by the binarization is calculated. In next step 162, it is determined whether the image existing rate in the overall density measurement area (standard image existing area F+panorama edge existing area P+central portion image area C) is smaller than a predetermined value a. If YES in step 162, the area rate of the image portion is very low throughout the overall density measurement area, it is difficult to determine an image size. In this case, the process proceeds to step 174 to determine the image size as a standard size, and the image-position/size determining process is ended.

On the other hand, if NO in step 162, it is determined in step 164 whether the image existing rate in the standard image existing area F is equal to or larger than a predetermined value b. If YES in step 164, the area rate of the image portion outside the recording range of a panorama-size image is high. For this reason, the process proceeds to step 174 to determine the image size as a standard size, and the image position/size determining process is ended. If NO in step 164, it is determined in step 166 whether an image existing rate in the panorama edge existing area P is equal to or larger than a predetermined value c. If YES in step 166, there is a high probability that the image recorded on the negative film 34 is estimated to be a panorama-size image. For this reason, the process proceeds to step 176 to determine the image size as a panorama size, and the image position/size determining process is ended.

If NO in step 166, as in a case wherein the decision of step 162 is YES, it is difficult to determine an image size. For this reason, it is determined in step 174 that the image is a standard size, and the image-position/size determining process is ended.

When it is determined in step 154 that the position $H_{POS}$ is located in the panorama edge existing area P, an image recorded on the negative film 34 is of a panorama size in almost cases. However, even when an image recorded on the negative film is of a standard size and has a density variation pattern which extends parallel to the boundaries of the image and over a predetermined length or more and which is formed near a position corresponding to a boundary of a panorama-size image (e.g., an image obtained by photographing a tin roof), there is a possibility of the position $H_{pos}$ being located in the panorama edge existing area P although depending on the magnitude of the change in density at the boundary of an actual image. For this reason, when the position $H_{POS}$ is located in the panorama edge existing area P, the process proceeds from step 54 to step 168.

In step 168, a plurality of measurement points which are present in a predetermined area A or a predetermined area B in the density measurement area are determined. Of the density variation values at the measurement point calculated in step 142, density variation values, in directions (eight directions), of a plurality of measurement points determined to be present in the predetermined area A or the predetermined area B are extracted. The range of the predetermined area A and the predetermined area B, as shown in FIG. 12, is assumed to be an area obtained by removing hatched areas shown in FIG. 12 from the range (range constituted by the standard image existing area F and the panorama edge existing area P) outside the image recording range of the panorama-size image.

Figure 12:
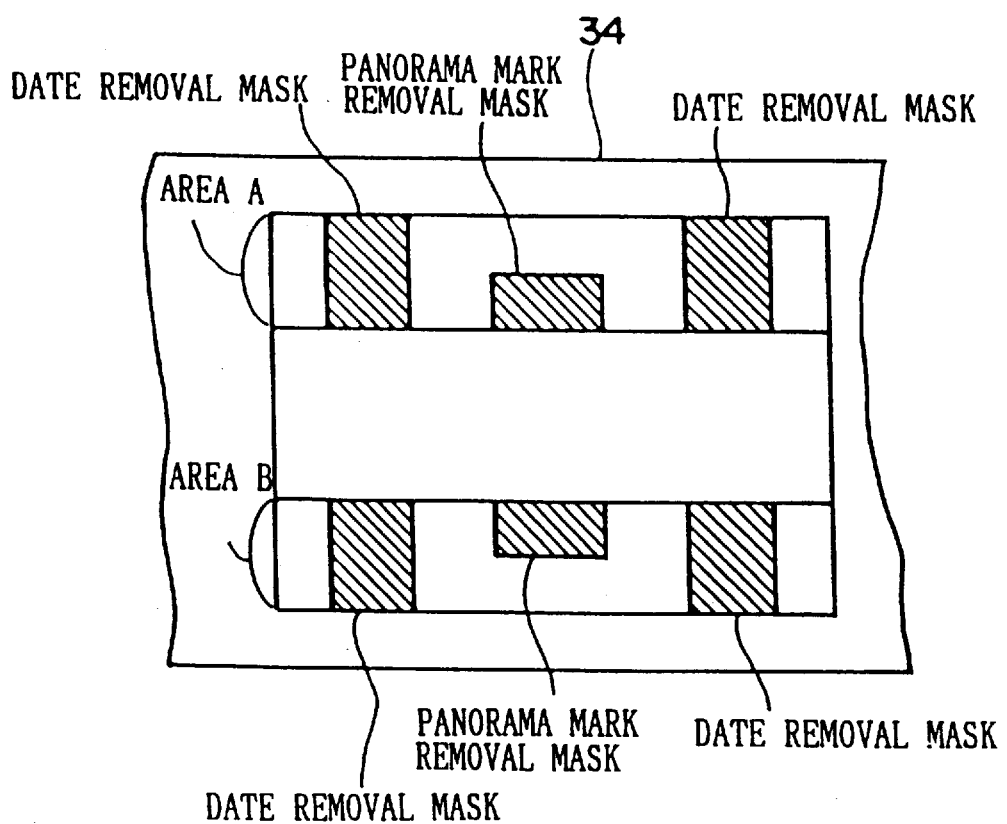
FIG. 12 is a plan view of a negative film showing areas A and B for calculating the variance and average value of density variation values.

Note that, of the hatched areas shown in FIG. 12, an area in which "date removal mask" is described is an area in which a date may be recorded by a camera, depending on the type of the camera used for recording an image on the negative film 34, when a panorama-size image is recorded. An area in which "panorama mark removal mask" is described in FIG. 12 is an area in which a mark indicating a panorama size may be recorded by a camera, depending on the type of the camera used for recording an image on the developed negative film 34, when a panorama-size image is recorded.

In step 170, the density variation value extracted in step 168 is normalized according to equation (1) described below, average values and variances at measurement points which are present in the predetermined areas A and B are calculated by using the normalized density variation value.

Equation 1

$$\text{normalized density variation value} = \frac{\text{density variation value which is not normalized}}{\text{maximum value of density variation value}} \times 100 \quad (1)$$

The present inventor performed an experiment in which the densities at a large number of measurement points in the predetermined area A and the predetermined area B were measured for a large number of standard-size images (including a standard-size image in which a density variation pattern extending over a predetermined length and parallel to the boundaries of the image is formed near a position corresponding to a boundary of a panorama-size image) and a large number of panorama-size images. A density variation amount at each measurement point was calculated, and the variance and average value of the calculated density variation amounts at the measurement points was calculated for each of the predetermined areas A and B. FIG. 13A shows a result obtained by plotting calculation results (variances and average values of density variation amounts) with respect to a standard-size image, and FIG. 13B shows a result obtained by plotting calculation results with respect to a panorama-size image.

Figure 13B:
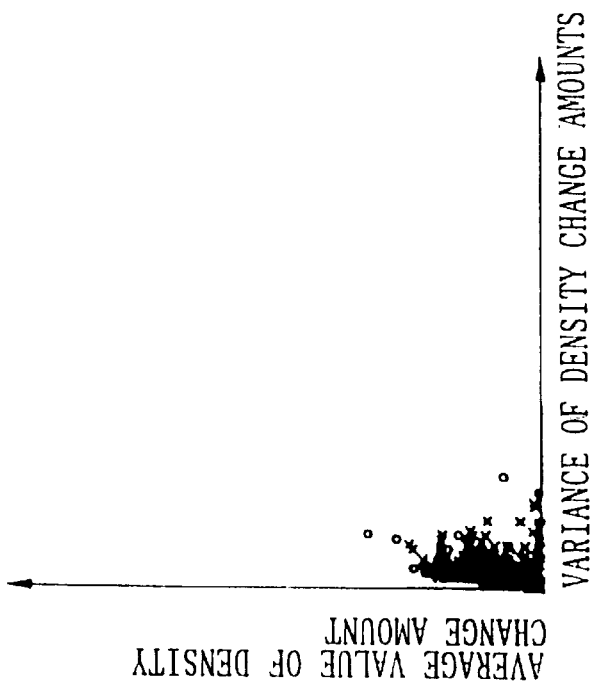
FIG. 13B is a graph showing an example of a result obtained by calculating, for a panorama-size image, the variance and average value of density variation values in the areas A and B outside a panorama-size image region.
Figure 13A:
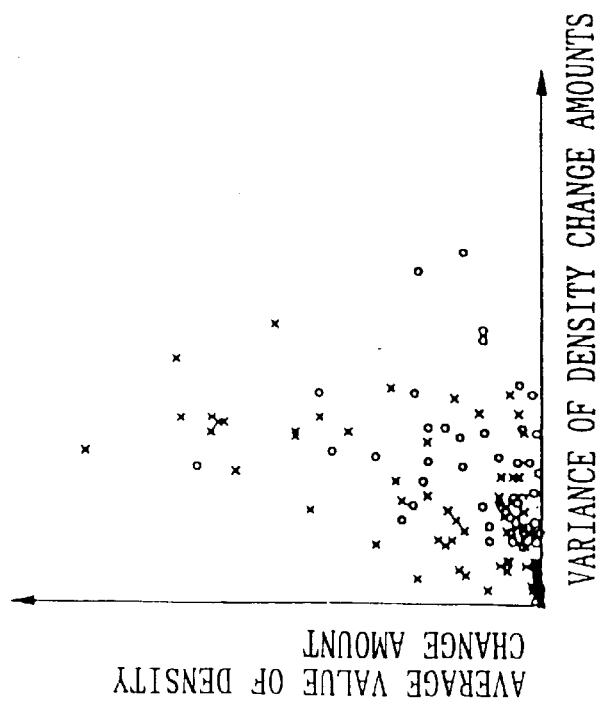
FIG. 13A is a graph showing an example of a result obtained by calculating, for a standard-size image, the variance and average value of density variation values in the areas A and B outside a panorama-size image region.

As is apparent from FIG. 13, in the panorama-size image, the variances and average values of density variation amounts in the predetermined areas A and B are relatively small, the dots representing the calculation results are concentrated within a relatively small predetermined range on the graph in FIG. 13B (see FIG. 3B). In contrast with this, in the standard-size image, the variances and average values of density variation amounts in the predetermined areas A and B are often relatively large, and it is understood that the dots representing the calculation results are distributed in a large area on the graph in FIG. 13A (see FIG. 13A). In the FIG. 13A showing the result with respect to the standard-size image, dots are plotted in the predetermined range in which dots representing results of the panorama-size image. However, the present inventor confirms that the results of the predetermined areas A and B corresponding to the same image are rarely plotted in the predetermined region.

A standard-size image in which a density variation pattern extending over a predetermined length and parallel to the boundaries of the image is formed near a position corresponding to a boundary of a panorama-size image shows the same tendency as described above for the following reason. That is, when the predetermined area is unexposed or is exposed by fogging, a change in density in the predetermined area and a change in density variation amount are relatively small, but when an image in the predetermined area is exposed, a density and a density variation amount in the predetermined area complicatedly change depending on the contents of the exposed image.

On the basis of the aforementioned, it is determined in step 172 whether the average values of density variation values calculated with respect to the predetermined areas A and B are smaller than the predetermined value c and whether the variances of density variation values are smaller than the predetermined value d. If YES in step 172, the process proceeds to step 176 to determine the image size as a panorama size, and the image position/size determining process is ended. If NO in step 172, the process proceeds to step 174 to determine the image size as a standard size, and the image position/size determining process is ended.

In the process shown in FIG. 3, when the positions of the boundaries of both the ends of the image in the film longitudinal direction are determined in step 148 in FIG. 4, YES is determined in step 104, and the process proceeds to step 116. On the basis of the positions of the boundaries of the image determined in step 148, it is determined in step 116 whether the image reaches an exposure position corresponding to the exposure stage 32. If YES in step 116, the process returns to step 100 to continuously perform the feeding operation of the negative film 34 (when a density measurement area corresponding to another image corresponds to the photometric stage 54, the feeding operation of the negative film 34 is continuously performed while performing density measurement with respect to the density measurement area.

If YES in step 116, the feeding operation of the negative film 34 is stopped (thereby positioning the image at an exposure position), and the process proceeds to step 118 to fetch the determination result of an image size obtained by the image position/size determining process. In next step 120, the image positioned at the exposure position is subjected to a photometric operation by the photometer 50. In step 122, a printing magnification is determined on the basis of the fetched determination result of the image size, and exposure conditions for printing the positioned image on the printing paper 48 is calculated on the basis of the photometric value of a reference negative film stored in the control circuit 52 in advance, the photometric value input from the photometer 50, and the printing magnification. The lens 44 is switched depending on the determined printing magnification, and the dimension of the opening in the variable negative mask of the exposure stage 32 is changed depending on the determined result of the image size. Further, movement of the filters of the light-adjusting filter section 40 and the black shutter 46 is controlled such that the exposure conditions for the printing paper 48 coincide with the determined exposure conditions. In this way, an exposure process is performed.

In step 126, it is determined whether a printing process for all the images recorded on the developed negative film 34 is ended. If NO in step 126, the process returns to step 100 to repeat the above-described processes. Therefore, each time density measurement for a density measurement area is completed, the image position/size determining process is performed to determine the position and size of an image corresponding to the density measurement area. On the basis of the determination result, positioning of the image and switching operations of the lens 44 and the variable negative mask are performed, and the exposure conditions are determined. In this way, the image of the negative film 34 is printed on the printing paper 48.

If YES in step 126, the negative film 34 is fed to the trailing end in the feeding direction in step 128, and the process is ended.

In the foregoing, a panorama size is exemplified as a size having a longitudinal dimension equal to that of the standard size and an aspect ratio smaller than that of the standard size. However, the present invention is not limited to the panorama size, and, as a matter of course, the present invention can be applied to a case wherein an image having another size such as an a powerful-vision size having an aspect ratio different from that of the panorama size is recorded. The present invention can also applied to determination of three or more different image sizes respectively having different aspect ratios.

In the foregoing, the line sensor 62 is exemplified as a density measurement means. A two-dimensional image sensor such as a CCD in which light-receiving elements are arranged in a matrix form may be used as the line sensor 62.

The differential filter shown in FIG. 3 is only an example. Conventionally known various edge detection operators such as Robinson, Prewitt, and Kirsch can be applied.

In addition, in a case in which the positions of boundaries of both ends of the image in the longitudinal direction of the film are detected, if the accumulated value of density variation values is equal to or larger than a predetermined value at each of a large number of measurement points of the first row, the positions of the boundaries of an image recorded on the negative film 34 are roughly estimated by using a circumstance in which an image recorded on the developed negative film 34 has a constant interval between the boundaries of both ends of the image in the longitudinal direction of the film regardless of the image size. However, since images are generally recorded on the developed negative film 34 at predetermined intervals, the positions of the boundaries may be roughly estimated on the basis of the position of another image whose position has been detected. In addition, in consideration of the changed condition of density values of a first row of measurement points in which the accumulated value of density variation values is equal to or larger than a predetermined value, a pair of first rows of measurement points which are estimated to correspond to the boundaries of both ends of the image in the longitudinal direction of the film may be selected.

In the foregoing, on the basis of the maximum point of a photometric value in a predetermined range in which the boundary of the density measurement area is estimated to be present at high probability, it is determined whether the density measurement range corresponds to a photometric position. However, the present invention is not limited to the same. For example, in an image approving step performed before the developed negative film 34 is set in the photographic printing apparatus 30, each image recorded on the negative film 34 is visually approved by an operator, and, with respect to an image which is determined as an image to be printed on a printing paper, a notch 34C is formed at a position corresponding to one end of the film in the transverse direction of the film (see FIG. 2). The notch 34C is formed at a substantially fixed position corresponding to an image to be printed. For this reason, a notch sensor 66 for detecting the notch 34C is provided in the photographic printing apparatus 30, so that, on the basis of the detection result of the notch sensor 66 and an amount by which the developed negative film 34 is fed after the notch 34C has been detected, it may be determined whether the density measurement area corresponds to the photometric position.

In the foregoing, when the position $H_{POS}$ is located in the central portion image area C, a threshold value is set with reference to the maximum value of densities by using the density histogram, and binarization is performed by using the threshold value to divide the density measurement area into an image portion and a non-image portion. The present invention is not limited to the same. The threshold value may be set with reference to the minimum value of densities, or a density value larger than the density of the base portion of a negative film by a predetermined value may be used as the threshold value. In addition, the density at each measurement point is resolved into a plurality of component colors to be measured, and the density measurement area may be divided into an image portion and a non-image portion by checking whether the portion has color information different from that of the base portion of the negative film. In the foregoing, although the base density of the negative film is calculated on the basis of the density histogram at each measurement point, the base density may be calculated in the following manner. That is, the base densities of negative films are measured for each of film types and stored in a storage means, and a bar code added to the negative film, a DX code added to the film case in which the negative film is stored, or the like is read to determine the film type of the negative film. In this way, the base density corresponding to the determined film type may be read and used.

In addition, a case was described in which the present invention is applied to the photographic printing apparatus 30. The present invention can also be applied to a photographic processing apparatus for performing another step in the photographic processing steps.

In the foregoing, a case was described in which a negative film is used as a photographic film. The present invention is not limited to the negative film, and it can be also applied to an image recorded on another photographic film such as a universal film. In addition, a case was described in which a plurality of images are recorded on an elongated belt-shaped film along the longitudinal direction of the film. However, the present invention can be also applied to a case wherein a plurality of images are recorded on a sheet-shaped film in a matrix form.

The embodiment of the present invention has been described above. This embodiment includes, in addition to the embodiment of technical items described in the claims of the present invention, an embodiment of the technical items described below.

A film image detection device according to the first aspect of the present invention further comprises a storage means for storing a dimension of an image recorded on the photographic film along a predetermined direction, wherein the determination means selects, from a plurality of first rows of measurement points each having an accumulated value of density variation amounts which is equal to or larger than a predetermined value, a pair of first rows of measurement points having an interval on the photographic film which is almost equal to the dimension stored in the storage means, and determines an image recording position and an image size on the basis of the positions of the selected pair of first rows of measurement points on the photographic film.

According to the above-described arrangement, an effect in that detection accuracy of at least one of the size and image recording position of an image recorded on a photographic film can be further improved can be obtained.

What is claimed is:

1. A film image detection device comprising:
   density measurement means for measuring densities at a large number of measurement points arranged along a first direction and a second direction crossing the first direction in a measurement area including an image recording range on a photographic film on which an image is recorded;
   density variation amount calculation means for calculating density variation amounts at the measurement points along the first and second directions on the basis of the densities at the measurement points in the measurement area measured by said density measurement means;
   accumulation means for accumulating the density variation amounts at the measurement points along the first direction calculated by said density variation amount calculation means for each of a plurality of first rows of measurement points constituted by a predetermined number of measurement points arranged along the second direction, and for accumulating the density variation amounts at the measurement points along the second direction for each of a plurality of second rows of measurement points constituted by a predetermined number of measurement points arranged along the first direction; and
   determination means for determining an image recording position and an image size on the basis of the accumulated value of the density variation amounts of the plurality of first rows of measurement points obtained by said accumulation means, the accumulated value of the density variation amounts of the plurality of second rows of measurement points obtained by said accumulation means, and the positions of the first and second rows of measurement points on the photographic film.

2. A film image detection device according to claim 1, wherein said density measurement means is one of a line sensor and a two-dimensional image sensor.

3. A film image detection device according to claim 1, wherein said density variation amount calculation means includes a differential filter, and the density variation amounts are calculated by the differential filter.

4. A film image detection device according to claim 1, wherein said accumulation means includes a first accumulation means for performing accumulation for each of the first measurement points and a second accumulation means for performing accumulation for each of the second measurement points.

5. A film image detection device according to claim 1, wherein said determination means determines the image recording position and the image size on the basis of a position, on the photographic film, having the maximum value of the accumulated values of the density variation amounts at the plurality of first rows of measurement points, and a position, on the photographic film, having the maximum value of the accumulated values of the density variation amounts at the plurality of second rows of measurement points.

6. A film image detection device according to claim 5, wherein said determination means determines the image recording position in the longitudinal direction of the photographic film on the basis of the position, on the photographic film, having the maximum value of the accumulated values of the density variation amounts at the plurality of first rows of measurement points.

7. A film image detection device according to claim 5, wherein said determination means determines the image recording position in the transverse direction of the photographic film on the basis of the position, on the photographic film, having the maximum value of the accumulated values of the density variation amounts at the plurality of second rows of measurement points.

8. A film image detection device according to claim 1, wherein said determination means determines the image size in the longitudinal direction of the photographic film on the basis of the positions, on the photographic film, having a pair of values not less than a predetermined value in the accumulated values of the density variation amounts of the plurality of first rows of measurement points.

9. A film image detection device according to claim 1, wherein said determination means determines the image size in the transverse direction of the photographic film on the basis of the positions, on the photographic film, having a pair of values not less than a predetermined value in the accumulated values of the density variation amounts of the plurality of second rows of measurement points.

10. A film image detection device according to claim 1, wherein said determination means determines whether the image size is a standard size or a panorama size having a dimension in the transverse direction of the photographic film which is smaller than that of the standard size.

11. A film image detection device according to claim 9, wherein said determination means determines whether the image size is a standard size or a panorama size having a dimension in the transverse direction of the photographic film which is smaller than that of the standard size.

12. A film image detection device according to claim 1, further comprising storage means for storing a dimension of an image recorded on the photographic film along a predetermined direction, wherein said determination means selects, from a plurality of first rows of measurement points each having an accumulated value of density variation amounts which is not less than a predetermined value, a pair of first rows of measurement points having an interval on the photographic film which is almost equal to the dimension stored in said storage means, and determines an image recording position and an image size on the basis of the positions of the selected pair of first rows of measurement points on the photographic film.

13. A film image detection device according to claim 1, wherein the first direction coincides with a direction along a substantially longitudinal direction of the photographic film, and the second direction coincides with a direction along a substantially transverse direction of the photographic film.

14. A film image detection method, comprising the steps of:
measuring densities at a large number of measurement points arranged along a first direction and a second direction crossing the first direction in a measurement area including an image recording range on a photographic film on which an image is recorded;
calculating density variation amounts at the measurement points along the first and second directions on the basis of the densities at the measurement points in the measured measurement area;
accumulating the calculated density variation amounts at the measurement points along the first direction for each of a plurality of first rows of measurement points constituted by a predetermined number of measurement points arranged along the second direction, and for accumulating the density variation amounts at the measurement points along the second direction for each of a plurality of second rows of measurement points constituted by a predetermined number of measurement points arranged along the first direction; and
determining an image recording position and an image size on the basis of the accumulated value of the density variation amounts of the plurality of first rows of measurement points, the accumulated value of the density variation amounts of the plurality of second rows of measurement points, and the positions of the first and second rows of measurement points on the photographic film.

15. A film image detection method according to claim 14, wherein the first direction coincides with a direction along a substantially longitudinal direction of the photographic film, and the second direction coincides with a direction along a substantially transverse direction of the photographic film.

16. A film image detection method according to claim 14, wherein the determination step determines the image recording position and the image size on the basis of a position, on the photographic film, having the maximum value of the accumulated values of the density variation amounts at the plurality of first rows of measurement points, and a position, on the photographic film, having the maximum value of the accumulated values of the density variation amounts at the plurality of second rows of measurement points.

17. A film image detection method according to claim 16, wherein the determination step determines the image recording position in the longitudinal direction of the photographic film on the basis of the position, on the photographic film, having the maximum value of the accumulated values of the density variation amounts at the plurality of first rows of measurement points.

18. A film image detection method according to claim 16, wherein the determination step determines the image recording position in the transverse direction of the photographic film on the basis of the position, on the photographic film, having the maximum value of the accumulated values of the density variation amounts at the plurality of second rows of measurement points.

19. A film image detection method according to claim 14, wherein the determination step determines the image size in the longitudinal direction of the photographic film on the basis of the positions, on the photographic film, having a pair of values not less than a predetermined value in the accumulated values of the density variation amounts of the plurality of first rows of measurement points.

20. A film image detection method according to claim 14, wherein the determination step determines the image size in the transverse direction of the photographic film on the basis of the positions, on the photographic film, having a pair of values not less than a predetermined value in the accumulated values of the density variation amounts of the plurality of second rows of measurement points.

21. A film image detection method according to claim 14, wherein the determination step determines whether the image size is a standard size or a panorama size having a dimension in the transverse direction of the photographic film which is smaller than that of the standard size.

22. A film image detection method according to claim 20, wherein the determination step determines whether the image size is a standard size or a panorama size having a dimension in the transverse direction of the photographic film which is smaller than that of the standard size.

23. A film image detection method according to claim 14, further comprising the step of storing a dimension of an image recorded on the photographic film along a predetermined direction, wherein the determination step selects, from a plurality of first rows of measurement points each having an accumulated value of density variation amounts which is not less than a predetermined value, a pair of first rows of measurement points having an interval on the photographic film which is almost equal to the dimension stored in said storage means, and determines an image recording position and an image size on the basis of the positions of the selected pair of first rows of measurement points on the photographic film.

* * * * *